No. 759,493.                                                         Patented May 10, 1904.

UNITED STATES PATENT OFFICE.

ISAAC ANDERSON, OF PRESCOTT, ARIZONA TERRITORY, ASSIGNOR OF ONE-HALF TO MICHAEL SCANLAN, OF WHITEHILLS, ARIZONA TERRITORY.

METHOD OF RECOVERING METALS FROM SOLUTIONS.

SPECIFICATION forming part of Letters Patent No. 759,493, dated May 10, 1904.

Application filed August 8, 1903. Serial No. 168,832. (No specimens.)

*To all whom it may concern:*

Be it known that I, ISAAC ANDERSON, a citizen of the United States, residing at Prescott, in the county of Yavapai and Territory of Arizona, have invented a new and useful Method of Recovering Metals from Solutions, of which the following is a specification.

This invention relates generally to recovering metals from solution, and more particularly to a method for recovering metallic values from so-called "mineralized" waters in which gold and silver and copper or iron, or both, are held in solution, the metals being in the form of salts of various kinds.

The waters to which this method of recovering metallic values is applied are waters such as flow from mines containing what are generally known as "base" ores—that is to say, gold and silver ores in which copper or iron, or both, are also present. Such waters also flow from stamp-mills and from pulp-vats and, without treatment in the manner hereinafter described, or in some other manner to effect the precipitation of the metallic values contained therein, the mineralized waters from any of the sources above mentioned carry away with them considerable quantities of dissolved metals, which may be recovered in an economical and practical manner.

Whenever mineralized waters contain gold and silver and iron or copper, or both, held in solution as salts of various acids, the metals present in the water may be recovered by adding to the water a sufficient quantity of slaked or unslaked lime in finely-divided condition to combine with the acids present in combination with the metals and with any free acid contained in the water. The quantity of the lime which must be added will of course vary with the quantity of metallic salts held in solution by the water and the amount of free acid, if any, that is also present, and the purity of the lime will also be a factor in determining the quantity to be added. The lime may be added to the mineralized water in any suitable apparatus, as in an ordinary flume, and the lime must be thoroughly mixed with the water by agitation brought about by the action of mechanical force or by the action of gravity in causing the water to flow down a flume. When lime has been added in sufficient quantity and the water, with the lime therein, has been subjected to agitation sufficient to bring about thorough mixing of the lime with the water, any gold and silver contained in the water will be precipitated in solid form and may be recovered by filtration or by allowing the solids in the water to settle in a suitable receptacle in the form of "sludge," from which the water may be decanted or which may be removed by any suitable means and treated by the cyanid process, by smelting, or any other preferred method to recover the metals therefrom.

The method above outlined is primarily intended for use in recovering from the waste water of mines the metallic values contained therein; but it is equally suitable for use in treating the tailings from stamp-batteries in which metals are held in solution by means of acids. When the tailings from batteries are treated, there will ordinarily be a certain amount of free acid to be overcome by the lime in addition to the acid by which the metals are held in solution, and sufficient lime to combine with the free acid, as well as with any combined with the metal, must be added.

When mineralized waters containing gold and silver in solution also contain salts of copper or iron, or both, the addition of lime alone to the waters and the thorough agitation of the mixture of water and lime will be sufficient to precipitate the metals; but in case the waters do not contain copper or iron in addition to the gold and silver it will be desirable to add either copper or iron, or both, to the solution before adding the lime. When the base metals are added to the solution containing gold and silver and lime afterward added, the action is the same as if the lime had been added to a solution containing all of the metals in the beginning.

I have found that lime is useful not only in recovering metallic values from mineral waters, but that it may be used to advantage with ores from which the metals are to be separated and recovered by amalgamation. Whenever the ores to be so treated contain acids which will affect the battery-screens or by acting upon the surface of the mercury arranged in the sluices for amalgamation the mercury will be coated with a thin film of some salt of mercury, which will lessen its activity as an amalgamating agent, and when it is desired to overcome the action of the acids in such ores upon the battery-screens and upon the surface of the mercury the lime is to be introduced with the ore into the batteries.

I am aware that it has been proposed to use lime in precipitating gold from sea-water, in which it is said to be present in the form of the iodid; but so far as I am aware lime has never been used under the circumstances set forth in the foregoing paragraphs to precipitate gold and silver from mineralized waters in which gold and silver are held in solution in the presence of iron or copper, or both;
nor has any one before my discovery, so far as I am aware, used lime with stamp-batteries along with the ore treated therein to prevent action of acids present in the ore upon the battery-screens and upon the mercury used for amalgamating the metals contained in the ore.

Having thus described the nature and use of my invention, what I claim as new, and desire to secure by Letters Patent, is—

1. The method of recovering precious metals from solutions, consisting in treating the solution with lime in the presence of baser metals.

2. The method of recovering gold and silver from solutions, consisting in treating the solution with finely-divided lime in the presence of iron or copper.

3. The method of recovering gold and silver from solutions in which iron or copper is present, consisting in treating the solution with a sufficient quantity of lime to combine with the acid present.

4. The method of recovering gold and silver from solutions containing iron or copper, consisting in treating the solution with lime and subjecting it to thorough agitation.

In testimony that I claim the foregoing as my own I have hereto affixed my signature in the presence of two witnesses.

ISAAC ANDERSON.

Witnesses:
J. C. WILSON,
M. McGETRICK.